Dec. 23, 1941.  G. H. RAKOWITZKY  2,267,422
CLOSING OF TINS
Filed Feb. 19, 1938

Inventor
Gregor H. Rakowitzky.
per Wm Wallace White
Attorney.

Patented Dec. 23, 1941

2,267,422

UNITED STATES PATENT OFFICE 2,267,422

CLOSING OF TINS

Gregor H. Rakowitzky, Vienna, Austria

Application February 19, 1938, Serial No. 191,357
In Austria March 15, 1937

2 Claims. (Cl. 99—182)

The closing of metal plate tins, particularly tins for containing preserves, is generally effected by soldering the lid or other part to be opened on to the tin. This soldering is a tedious operation which increases the cost of the closing and which also renders difficult the opening of the tin.

It has consequently already been proposed to make the lid or other part of the tin to be opened of material which can be easily cut and which permits the cutting open of the lid with an ordinary knife, or other sharp instrument, and the connection of the lid with the edge of the tin by folding without soldering. Such a lid, however, is easily damaged on the closing of the tin. Moreover, such a lid cannot be used for all tins which have to be heated in order to sterilise the contents of the tin by boiling, since the lid cannot withstand the pressure generated in the tin by boiling, which pressure is sufficiently great to bend even a solid metal lid. This disadvantage is not overcome if, as has already been proposed, a reinforcing ring is mounted on the margin of the lid and the superposed edges of the lid and reinforcing ring are rolled together with the edge of the tin to close the latter and facilitate the connection of the lid with the edge of the tin, which connection is made more difficult in consequence of the material used. The reinforcing ring only facilitates the rolling-in of the edge of the lid with the edge of the tin but does not protect or reinforce the lid itself.

Even when there is inserted in the said reinforcing ring, for its reinforcement, an auxiliary lid which is arranged so as to maintain the tin closed after the main closing lid has been cut open, the latter lid is no better protected. The auxiliary lid protects the main closing lid in transport and from damage before the use of the tin but it cannot prevent damage during the closing operation since it can only be inserted in the reinforcing ring after the completion of the said operation. Moreover, the auxiliary lid cannot take up the pressure arising in the interior of the tin on the boiling of the contents thereof. This pressure is so considerable that it deforms the main closing lid, which has little resistance and cannot withstand alone the stresses occurring, to such an extent that it lifts the auxiliary lid from its seat and presses it out of the ring.

The present invention permits a tight closing of the tin with a lid of material which is easy to cut and which, on the closing of the tin, is protected from damage and excessive stresses and permits a boiling of the tin without any injury to the closure. This is attained by the use, for the closing of the tin, in addition to an inner lid of a flexible dense material capable of being cut by a knife or the like, of an outer solid lid of sufficiently resistant material, preferably metal plate, placed on the inner cover or lid, and by rolling or folding the superposed edges of the two lids together with the edge of the tin. After completing the closing operation and, in the case of tins the contents of which are boiled, after the boiling, the central portion of the outer lid up to the edge part is removed, preferably being cut out. The tin is then closed only by the easily cut inner lid and can be rapidly and easily opened.

In order to obviate damage to the inner closing lid, which is easily subject to damage, on the removal of the central portion of the outer lid, this is preferably effected according to a feature of the invention by cutting in a direction parallel or approximately parallel to the inner closing lid, the inner edge of the remaining marginal portion of the outer lid being preferably bent over or rolled-in during the cutting operation, in order also to prevent injury to the hand thereby when using the tin.

In order to permit the cutting out of the outer lid parallel or approximately parallel to the inner closing lid, the outer lid may be so formed that the central portion thereof to be removed and against which the inner closing lid bears on the fitting of the lid on the tin as also on the boiling (sterilisation) of the contents of the tin, merges by an upright or approximately upright wall part into the marginal portion of the outer lid.

The accompanying drawing shows, by way of example, a metal plate tin closed by the method according to the invention.

Figure 1:
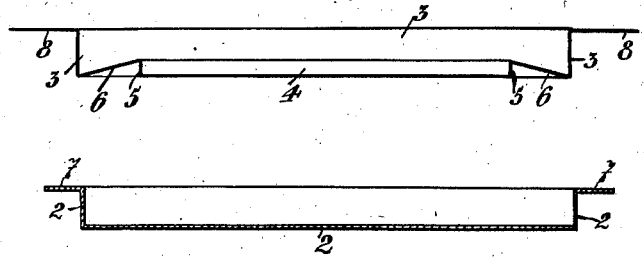
Figure 1 shows the two lids used for closing the tin, and Figure 2 the closed tin in section.
Figure 2:
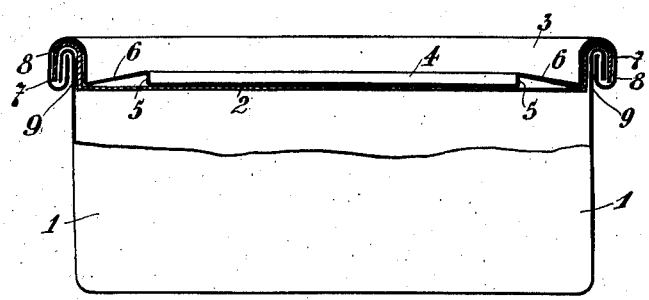

To close the metal plate tin 1, made as desired, there are used two lids (Figures 1 and 2). The inner lid 2 is made of a dense flexible material adapted to be easily cut with a knife, e. g. a material such as regenerated cellulose or a cellulose derivative, or a metal foil pasted on to paper. The aforesaid cellulosic material can also be used with a layer of paper or metal foil, e. g. aluminium foil, on one or both sides, or a layer of paper with a metal foil on both sides, or a similar material. If the contents of the tin are to be protected from the injurious effects of light, coloured cellulosic material can be used.

There is placed on the lid 2, a second outer lid 3 of sufficiently strong material, preferably metal plate, the central portion 4 of which is depressed and merges by an upright bend 5 into the marginal portion 6.

Both lids 2, 3 are placed one over the other on the tin to be closed and the superposed lid edges 7, 8 are folded together with the edge 9 of the tin, in known manner (Figure 2). The edge 7 of the flexible inner lid 2 is pressed in between the folds of the edges of the tin and of the outer lid 3 and thus a tight closing of the tin is attained. In closing the tin, the inner more delicate lid 2 is sufficiently protected by the outer lid 3 even when a sterilisation of the contents of the tin takes place by evacuation of the air. In most cases, however, the contents of the tin are sterilised by boiling. The inner and weaker lid 2 is then also completely protected by the outer stronger lid 3. The lids, in consequence of the considerable internal pressure occurring within the tin on the boiling, bend considerably but remain entirely undamaged since the easily damaged inner lid 2 bears at the points of its greatest stress against the stronger solid outer lid 3. It is impossible for the tin to become leaky.

Figure 3:
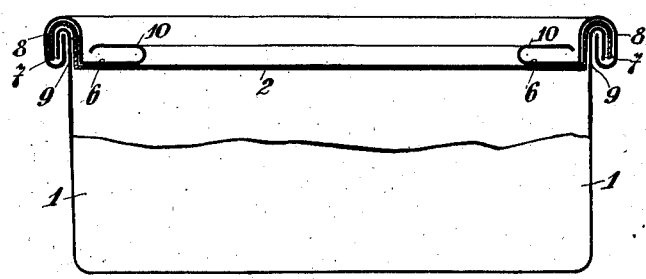
Figures 3 and 4 are views similar to Figure 2 but showing subsequent operations on the tin.
Figure 4:
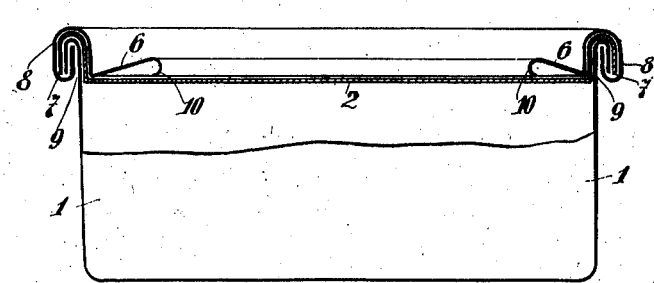

After the boiling of the contents of the tin, the central portion 4 of the outer lid 3 is removed being preferably cut away at the bend 5. The cut is made parallel or approximately parallel to the inner lid 2. The cutting of the lid 3 is effected preferably by means of a known tool which, on the cutting at the point of the bend 5, at the same time rolls the inner edge 10 of the marginal portion 6 (Figures 3 and 4), whereby the remainder of said marginal portion is given greater strength and the tin has a better appearance whilst the inner lid 2 is protected from damage caused by the sharp edge of the remaining marginal portion. The upward bend 5 is of great advantage as it permits making the cut parallel to the inner lid 2 and ensures the latter from any injury on the cutting through of the outer lid and furthermore permits the edge of the remaining marginal portion 6 of the outer lid being bent over and rolled-in during the cutting out of the central portion 4. The edge of the marginal portion 6 can be folded as required either upwards as shown in Figure 3 or downwards as shown in Figure 4. The tin which the lid 2 tightly closes, can now be used. The contents of the tin are sufficiently protected and by the use of a transparent inner lid, e. g. of the aforesaid cellulosic material are also visible. To open the tin, the inner lid 2 is cut with an ordinary knife, or a sharp instrument, e. g. a nail, along the remaining rolled-in edge part 10 of the outer lid 3.

The central portion 4 cut out of the outer lid 2 from a large metal plate 3 can be used for making the lid of a smaller tin.

Having now particularly described and ascertained the nature of my said invention and in what manner the same is to be performed, I declare that what I claim is:

1. A process for the canning of food-products which comprises applying to the container an inner main sealing cover with an outer temporary cover in one integral piece of relatively strong material superimposed thereon to withstand internal pressure, securing the inner and outer covers together and to the rim of the container and sealing the container with the contents enclosed therein, subjecting the sealed products to heat treatment creating internal pressure that is resisted by the outer cover, and cutting the outer cover to remove a portion thereof and partly expose the main cover after the internal pressure has returned to normal.

2. A canning process which comprises applying to the container an inner main sealing cover with an outer temporary cover of relatively strong material superimposed thereon to withstand internal pressure, securing the inner and outer covers together and to the rim of the container and sealing the container with the contents enclosed therein, subjecting the sealed products to heat treatment creating internal pressure that is resisted by the outer cover, cutting the outer cover in a substantially horizontal plane through a vertical band or skirt portion pressed into the said cover to thus remove a portion thereof and partly expose the main cover after the internal pressure has returned to normal, and finally rolling the inner peripheral cut edge of the outer cover upon itself to protect the main cover from such edge.

GREGOR H. RAKOWITZKY.